(No Model.)

C. G. YOUNG.
SAFETY DEVICE FOR DYNAMOS.

No. 453,281. Patented June 2, 1891.

Witnesses:-
Will H. Courtland
Nellie L. Pope

Inventor:-
CHARLES G. YOUNG.
BY HIS ATTORNEY
Edward P. Thompson.

UNITED STATES PATENT OFFICE.

CHARLES GRIFFITH YOUNG, OF NEW YORK, N. Y.

SAFETY DEVICE FOR DYNAMOS.

SPECIFICATION forming part of Letters Patent No. 453,281, dated June 2, 1891.

Application filed March 31, 1890. Serial No. 346,018. (No model.)

*To all whom it may concern:*

Be it known that I, CHARLES GRIFFITH YOUNG, a citizen of the United States, and a resident of New York, county and State of New York, have invented certain new and useful Improvements in Safety Devices for Dynamos, of which the following is a specification.

My invention relates to a system of electrical distribution for electric lighting and power provided with means for interrupting both the outgoing and the incoming main or external lines with respect to their electrical connection to the electrical generator or dynamo or for interrupting the field-magnet circuit of the dynamo automatically upon grounding of the main line.

The invention is carried out in such a manner as to be applicable to alternating, pulsating, or intermittent circuits.

The object of the invention is to cause the whole main line to exist free from danger or to become "dead" on the instant that the same becomes practically useless by grounding or forming an electric connection with the earth.

My invention provides that the whole main line beyond the poles of the dynamo or outside of the central station where the dynamo is located shall be out of electrical contact with the dynamo, or shall be put into such a condition that it will be impossible for a current to pass from the dynamo to any part of the main line outside of said central station when the main line becomes grounded, as it may, by coming in contact with a telegraph or telephone wire.

The invention is described by reference to the accompanying drawings.

Figure 1:
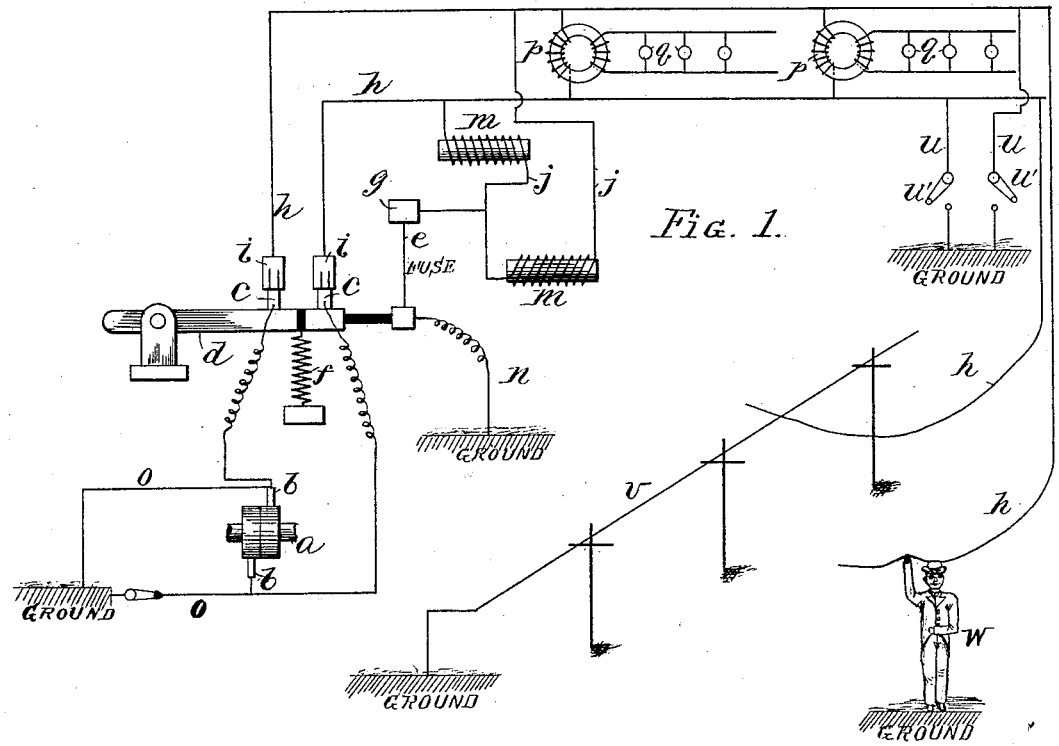
Figure 2:
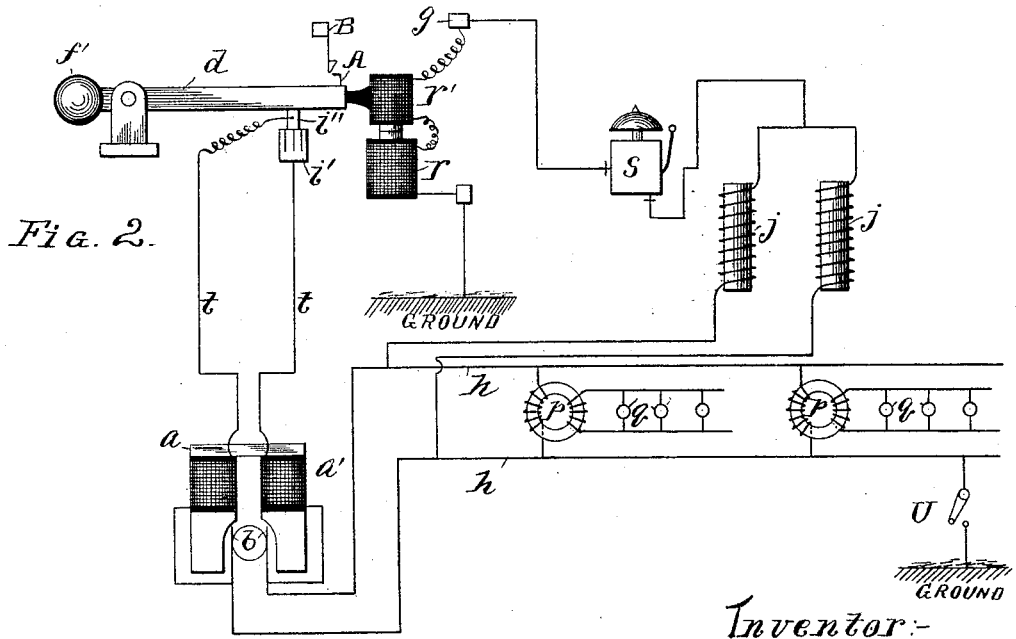

Figure 1 shows the system partly in diagram and so drawn as to illustrate the condition of the same where one wire of the main line is about to come in contact with a telegraph or telephone wire, and where a person is about to touch one of the other wires, so that the system is shown in its normal condition of operation just before the main lines have sagged. Fig. 2 is a view of the system in its normal condition, while involving some modifications, such as the substitution of a magnet and its armature for a fuse, and a circuit-breaker in circuit with a field-magnet instead of circuit-breakers in circuit with the poles of the dynamo. An electrical bell is also shown for giving an audible signal under certain conditions.

The complete system embodying my invention consists of the combination of a dynamo $a$, having brushes $b$, connected, respectively, with the dynamo terminals or poles $c$, carried upon a pivoted lever $d$, which is held in an operative position by a fuse $e$, one end of which is attached to the lever $d$, which tends to fall downward by its own weight and by force of the retractile spring $f$, and the other end of which is attached to the stationary block $g$, and which is marked on the drawings "Fuse," the two poles $c$ being insulated from each other and both from the fuse $e$; outgoing and incoming main lines $h$, having terminal brushes $i$, respectively, in contact with the poles $c$; electrical conductors $j$, each including in circuit choking-magnets $m$, and both being connected in circuit with the fuse $e$ at the block $g$, the other end of the fuse being connected to ground by the conductor $n$, and conductors $o$, representing the usual or frequently-occurring leakage from the dynamo-poles to the ground, or representing accidental but high-resistance connections to the ground.

Both figures represent a multiple system of distribution for electric lighting or power, the converters $p$ being in multiple arc or parallel with translating devices $q$, such as lamps or motors.

It may be stated here that the nature of my invention is such as to be operative upon such a system as well as upon a series distribution system.

In Fig. 2, between the block $g$ and the ground, and instead of the fuse $e$, are placed a magnet $r$ and an armature $r'$, which is wound and in series with said magnet and is carried upon the lever $d$ and is partly counterbalanced by the weight $f'$. An electric bell is located in circuit between the block $g$ and the choking-magnets $j$. The conductor $t$ is a part of the circuit of the field-magnet $a'$. In circuit with the conductor $t$ are the fixed terminal $i'$ and the terminal $i''$, which is carried by the lever $d$, in such a manner that when the armature $r'$ is repelled by the magnet $r$ the said two terminals $i'$ and $i''$ will separate and the field-circuit become interrupted, so that it is impossible for the dynamo $a$ to generate any current on the main lines $h$, so that this part of the operation of the system will be similar to that in Fig. 1, where if the fuse $e$ melts the contacts or terminals $c$ and $i$ separate.

The operation of the system is as follows: The conductors $u$ represent how electrical connections may occur between the main lines $h$ and the ground by closing the circuit-closers $u'$. However, let us suppose that a building is on fire or that a blizzard or some similar catastrophe occurs whereby a portion of the main lines drop from their poles and sag so that one of them is about to come in contact with the telephone or telegraph wire $v$, which is connected to ground. Just as soon as it touches said wire, or within a small fraction of a second thereafter, a circuit will be closed through the fuse $e$, and the latter will break by melting, and the poles $c$ of the generator will become electrically separated from the terminals $i$ of the main lines. Consequently if subsequently a person $w$ should run against the wire—say the other one from that which touched the wire $v$ or the same one $h$—while standing on the ground or other object which has connection with the ground, and that he raised his hand to remove the main line $h$ and touched the same, then he would not receive a shock, thereby showing that the main lines become dangerless after they have become practically useless only by providing means for electrically separating them from the dynamo or by placing the latter under such a condition that it is absolutely impossible for a current to pass from the dynamo to either one or both of the main lines. If only the one line $h$ should come in contact with the wire $v$ and it only should be cut out, then subsequently the person $w$ would get a shock which in most systems working under high potential would kill him on account of there occurring so often a leakage or considerable electrical connection between the poles of the dynamo and the ground, or we may imagine, instead of the person $w$ being killed, a dwelling or other combustible object which might be set on fire. If in Fig. 2 a main line should become grounded, as by closing the circuit-closer U, then a current would pass through one of the choking-magnets $j$, ring the bell $s$, and cause repulsion of the armature $r'$ from the magnet $r$, whereby the field-magnet $a'$ would become broken as to its circuit by the separating of the terminals $i'$ and $i''$, so that it would be impossible for a current to be generated over either one of the main lines until the conductor $t$ was again made continuous. The signal will ring for an instant before said terminals separate, thereby informing the engineer that an accident has occurred by the grounding of the main line.

In Fig. 2, when the lever $d$ is repelled by the magnet $r$ it becomes held up by the hook A attached thereto catching upon the spring-hook B, located in a stationary manner just above the hook A.

I claim as my invention—

1. In a system of electrical distribution, the combination of an electric generator, a main line in circuit therewith, and a cut-out in circuit with said generator and controlled by a device in continuous circuit with said main line and the ground.

2. The combination of an electric generator, a main line in circuit therewith, translating devices in said main line in multiple arc with each other, a cut-out in circuit in or near the generator controlled by a device in continuous circuit between the ground and said main line at a given point to hold the circuit closed while the main line is insulated from the ground at all other points, and to open the circuit when the main line becomes grounded at a second point.

In testimony that I claim the foregoing as my invention I have signed my name, in presence of two witnesses, this 17th day of March, 1890.

CHARLES GRIFFITH YOUNG.

Witnesses:
EDWARD P. THOMPSON,
WILL A. COURTLAND.